3,005,498
POTATO DIGGER
Edwin F. Huddle, Elmwood Park, Ill., assignor to International Harvester Company, Chicago, Ill., a corporation of New Jersey
Filed May 25, 1959, Ser. No. 815,658
2 Claims. (Cl. 171—109)

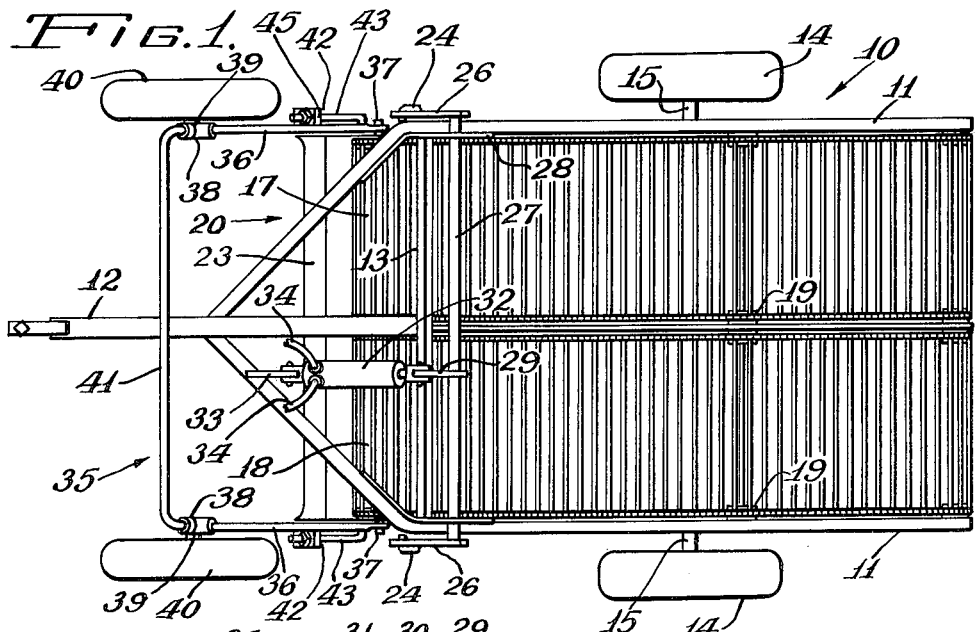
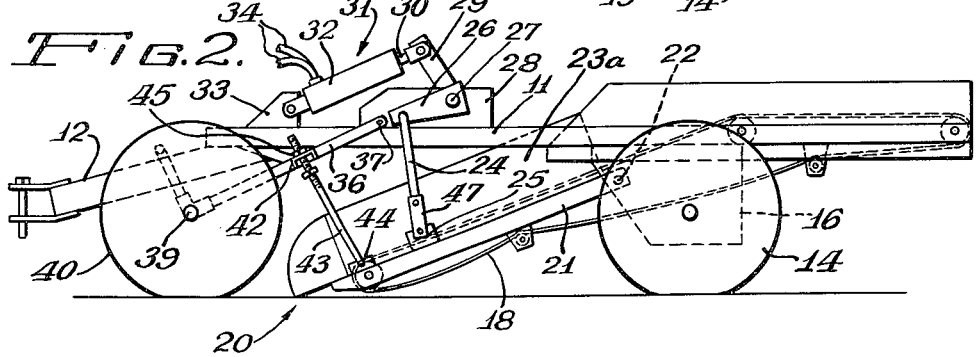
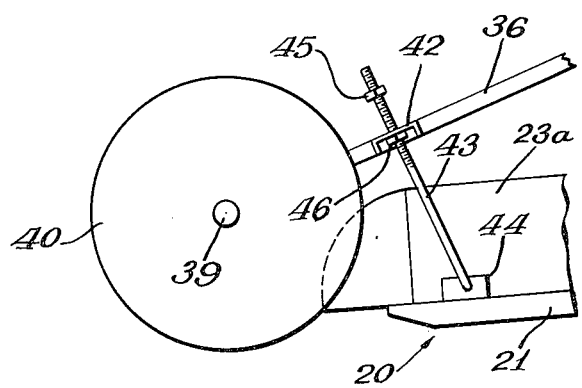

This invention relates to agricultural implements and particularly to root crop harvesters and the like. More specifically, the invention concerns a potato digger and improved means for controlling the operation thereof.

Potato diggers which operate upon two rows of potatoes at a time are well known. It is customary to utilize, in digging two rows of potatoes simultaneously, a single relatively wide blade member which extends across adjacent rows, by its very width creating operating problems. In most sections of the country potatoes are planted in hills, and a two-row digger is arranged to penetrate the ground below a pair of adjacent hills.

Because of variations in ground level in a field where potatoes are grown, the level of adjacent hills may vary considerably in the length of a field to be harvested, and in conventional potato diggers the blade may periodically dig potatoes in one row but fail to do so in the adjacent row. Therefore, an object of this invention is the provision of an improved digger for potatoes and the like.

Another object of the invention is the provision in a potato digger, of improved means for controlling the operation of the digger blade.

A further object of the invention is the provision in a potato digger of gauging means adapted to equalize the operation of a relatively wide digger blade.

Other objects and advantages of the invention will become clear from the following detailed description when read in conjunction with the accompanying drawings, wherein:

FIGURE 1 is a plan view of a potato digger incorporating the novel control means of this invention;

FIGURE 2 is a view in side elevation of the structure shown in FIGURE 1; and

FIGURE 3 is an enlarged detail showing the relationship of the gauge wheel and digger in the transport position thereof.

Referring to the drawings, the numeral 10 designates a travelling support including side frame bars 11 converging at their forward ends and affixed to a central longitudinal draft bar 12, affixed at its rear end to a transverse brace 13. The travelling support 10 includes a pair of laterally spaced wheels 14 mounted on the shafts 15 carried by brackets 16 secured to and depending from the frame bars 11.

The potato digging machine with which this invention is concerned is a two-row machine, and two side-by-side flights of endless conveyor chains are indicated at 17 and 18, the chains being trained over a plurality of rollers 19. Forming part of the machine is a digger blade and conveyor assembly 20, which for the purposes of this invention, may be regarded as of conventional construction, comprising two or more laterally spaced frame bars 21 pivotally connected at 22 to the brackets 16, only one of which is shown. A transversely extending earth-penetrating blade 23 is secured to the forward ends of the bars 21, and the entire assembly 20 flanked by side walls 23a and is capable of vertical swinging movement about the pivots 22 relative to the travelling support 10.

The implement of this invention may be propelled by a tractor or other source of power, and it should be understood that the endless conveyor chains 17 and 18 may be driven by any suitable means, not shown.

Vertical movement of the digger frame 20 between operating and transport position is accomplished by the provision of a pair of lift links 24 connected at their lower ends to lugs 25, one of which is provided at each side of the digger frame.

The upper ends of lift links 24 are pivotally connected to lift arms 26, mounted on opposite ends of a transverse shaft 27, rockably mounted at its ends in brackets 28 secured to the side bars 11. The rocking of shaft 27 to raise and lower the digger frame to move the latter between transport and operating positions, respectively, is accomplished by the provision of a rock arm 29 affixed to shaft 27 and pivotally connected at its upper end to a piston rod 30 forming part of a hydraulic ram 31 and slidable in a cylinder 32 pivotally anchored to a lug 33 affixed to the forwardly converging end of one of the side bars 11. The hydraulic ram 31 is preferably supplied with fluid under pressure from the tractor or other vehicles, not shown, by which the implement is propelled over the ground. Fluid is supplied through hose lines 34, and extension of the piston rod 30 in the cylinder 32 rocks arm 29 in a clockwise direction, as viewed in FIGURE 2, to raise lift arm 26 and the digger frame 20. Retraction of the piston rod in the cylinder lowers the frame 20 to its operating position.

The depth of operation of the digger blade 23 is gauged at opposite ends thereof by the provision of a gauge wheel support indicated at 35 comprising a pair of longitudinally extending supporting arms 36 mounted at their rear ends on pivot pins 37 carried by brackets 28 for vertical swinging. Arms 36 are tubular in section and are received in sleeve members 38 to which are affixed stub axles 39 upon which are mounted ground engaging wheels 40. Sleeve 38 is angled and the other ends of the respective sleeves receive the downwardly bent ends of a transverse member 41 which is adapted to engage draft bar 12 and limit the downward swinging movement of wheel-carrying arms 36 about the axes of pins 37.

Wheels 40 are thus connected together to function as a unit and gauge the operating depth of the digger blade 23. For this purpose each of the arms 36 has affixed thereto and projecting outwardly therefrom a lug 42 which is apertured to slidably receive the threaded upper end of a rod 43, the lower end of which is pivotally connected to a lug 44 affixed to the respective bars 21. A nut 45 threaded on the upper end of rod 43 is adapted to engage lug 42 when the digger blade 23 is in operating position, as indicated generally in FIGURE 2, and the nut 45 is adjustable to vary the operating depth of the blade.

Thus the operating depth of the digger blade 23 and therefore the position of conveyor assembly 20 mounted on the travelling implement support is gauged by a pair of interconnected wheels 40 carried by arms 36 separately mounted on the implement frame.

As pointed out hereinbefore, raising of the digger blade and forward lower end of the conveyor assembly to transport position is accomplished by actuation of the ram 31, piston rod 30 being extended in the cylinder 32 to rock the shaft 27 and raise the digger frame. As the blade and conveyor assembly 20 rises, nut 45 moves away from lug 42 and another nut 46 on rod 43 engages the lower surface of lug 42 and raises the wheel 40 and supporting wheels 40 and supporting arms 36 after a predetermined upward movement of the digger unit.

It may be noted that lift link 24 is preferably connected to lug 25 through the intermediary of a pivoted link 47, making it possible for link 47 to jackknife with respect to the link 24 and accommodate floating movement to some extent of the digger blade assembly and to facilitate attachment of the hydraulic ram 31.

It is believed that the novel depth control apparatus of this invention will be clearly understood from the foregoing description. It should likewise be understood, however, that the invention has been described in its preferred embodiment only, and that modifications may be made therein without departing from the spirit of the invention or the scope of the appended claims.

What is claimed is:

1. In a multiple row potato digger, a supporting frame, an inclined digger frame pivotally mounted on the supporting frame including relatively wide earth penetrating blade means adapted to span adjacent rows of potatoes and conveyor means adapted to receive and elevate potatoes dug by said blade means, lift means on the supporting frame operatively connected to the digger frame for raising and lowering the latter, a gauge wheel at each side of said blade means, an arm supporting each said gauge wheel, said arms extending rearwardly from said wheels and pivotally connected to said supporting frame for vertical swinging, a link connecting each said arm to said digger frame and accommodating relative movement therebetween, means on said link limiting upward movement of said arm relative to said digger frame, and a stop on said link engageable with said arm limiting the downward movement of each said arm relative to the digger frame, whereby said wheel-carrying arms are lifted when the digger frame is lifted.

2. In a potato digger adapter to dig potatoes planted in hills, a supporting frame, an inclined digger frame including a transverse earth-penetrating blade adapted to penetrate the base of the planted hills and an endless conveyor rearwardly thereof, said digger frame being pivotally connected to the supporting frame and extending forwardly and downwardly therefrom to remove the potatoes from the ground and convey them upwardly and rearwardly, power lift means on said supporting frame connected to said digger frame for raising and lowering the latter about its pivot on the supporting frame, wheel-carrying arms pivotally mounted on the supporting frame and extending forwardly therefrom for vertical movement relative thereto and to said digger frame, the wheels carried by said arms being arranged to engage the ground between adjacent hills, and means operatively connecting said wheels to said digger frame to gauge the operating position of said blade, comprising a connecting link pivotally connected to the digger frame, a bracket on said wheel-carrying arm having an aperture therein adapted to slidably receive said connecting link, an adjustable stop on said link engageable with said bracket to limit the downward pivoting of said digger frame relative to said wheel, whereby to gauge the operating depth of the blade, and another stop on said connecting link engageable with said bracket to raise the gauge wheel to inoperative position upon actuation of said power lift means.

References Cited in the file of this patent
UNITED STATES PATENTS

| | | |
|---|---|---|
| 2,384,623 | Kingsbury | Sept. 11, 1945 |
| 2,544,744 | Young | Mar. 13, 1951 |
| 2,583,241 | Tranter et al. | Jan. 22, 1952 |